(12) United States Patent
Kerofsky

(10) Patent No.: US 7,079,693 B2
(45) Date of Patent: Jul. 18, 2006

(54) FAST IMAGE DECOMPRESSION VIA LOOK UP TABLE

(75) Inventor: Louis J. Kerofsky, Portland, OR (US)

(73) Assignee: Sharp Laboratories of America, Inc., Camas, WA (US)

(*) Notice: Subject to any disclaimer, the term of this patent is extended or adjusted under 35 U.S.C. 154(b) by 0 days.

(21) Appl. No.: 10/982,637

(22) Filed: Nov. 5, 2004

(65) Prior Publication Data

US 2005/0089231 A1 Apr. 28, 2005

Related U.S. Application Data

(62) Division of application No. 09/952,643, filed on Sep. 13, 2001, now Pat. No. 7,046,852.

(51) Int. Cl.
*G06K 9/36* (2006.01)
*G06K 9/46* (2006.01)

(52) U.S. Cl. .................. 382/233; 382/246
(58) Field of Classification Search .......... 382/232, 382/233, 244, 246, 248, 250, 251, 253; 375/225, 375/229, 240.03, 240.16, 240.19, 240.2, 375/240.23, 240.25, 341, 345, 346; 348/21, 348/607

See application file for complete search history.

(56) References Cited

U.S. PATENT DOCUMENTS

| 5,539,468 | A | * | 7/1996 | Suzuki et al. | 375/240.2 |
| 5,748,226 | A | * | 5/1998 | Limberg | 348/21 |
| 5,801,790 | A | * | 9/1998 | Limberg | 348/607 |
| 6,072,828 | A | * | 6/2000 | Chun | 375/229 |
| 6,084,926 | A | * | 7/2000 | Zak et al. | 375/341 |
| 6,088,405 | A | * | 7/2000 | Hladik et al. | 375/341 |
| 6,330,365 | B1 | * | 12/2001 | Yasuda et al. | 382/233 |
| 6,393,060 | B1 | * | 5/2002 | Jeong | 375/240.19 |
| 6,721,373 | B1 | * | 4/2004 | Frenkel et al. | 375/346 |
| 6,792,055 | B1 | * | 9/2004 | Hart | 375/345 |
| 2001/0055334 | A1 | * | 12/2001 | Tiedemann et al. | 375/225 |

* cited by examiner

*Primary Examiner*—Amir Alavi
(74) *Attorney, Agent, or Firm*—Chernoff, Vilhauer, McClung & Stenzel

(57) ABSTRACT

A system to decode compressed digital images decodes frequently occurring variable length symbols encoding a compressed image by selecting a corresponding quantized pixel value for inverse quantization from a table relating code symbols and precalculated quantized pixel values.

5 Claims, 3 Drawing Sheets

FAST IMAGE DECOMPRESSION VIA LOOK UP TABLE

CROSS REFERENCE TO RELATED DOCUMENTS

The present application is a divisional of U.S. patent application Ser. No. 09/952,643 filed Sep. 13, 2001 now U.S. Pat. No. 7,046,852.

BACKGROUND OF THE INVENTION

The present invention relates to the field of digital image processing and, more particularly, to a fast decoding system for transform coded compressed digital images.

For digital image processing, an image is typically represented as an array of data expressing the values of a plurality of picture elements or pixels. Each pixel is a sample of the intensity of the image at a set of coordinates defined by a rectangular grid virtually overlaying the image. The analog signal obtained by sampling the image at the spatial coordinates of a pixel is quantized to a discrete value that is proportional to the amplitude of the intensity or luminosity of the sample. Typically, the data for a pixel comprises a value representing the intensity of the pixel or a plurality of interlaced values representing the intensities of the component colors of the pixel. The image can be reconstructed for viewing by "inverting" the quantized discrete sample values to produce a plurality of colored or white dots mapped to coordinates determined by the pixels of the original image.

While representing an image as an array of discrete pixel values is useful for image processing, the quantity of data required to represent an image is formidable. For example, an image created for display on a typical computer monitor can have a resolution of 640×480 pixels. If the grayscale intensity of a component color of the pixel can be resolved to 256 levels, each component color of each pixel will be represented by 8 bits and the total image will require nearly 1 MB or approximately the storage space required for 300 pages of single spaced text. In addition, digital video may require more than sixty images per second. If digital image data were not compressed before storage or transmission, such large quantities of data would make digital imaging impractical for many applications.

Referring to FIG. 1, a digital image compression system 20 comprises, generally, an encoder 22 for compressing the image data for storage or transmission and a decoder 24 which reverses the encoding process to reconstruct the image for display. The intensities of the image pixels 26, obtained by sampling the original image, are input to the encoder 22. For many applications, the quantity of image pixel data 26 must be reduced to such an extent that lossy compression is necessary. Typically, the spatial domain pixel data is converted or transformed to data in another domain to make it easier to identify the data that is likely to be irrelevant to human viewers and, therefore, can be discarded during the compression process. Several different transformation methods have been proposed for use and are used in digital image processing. On common method is block-based transformation in which the pixels of the image are divided into a plurality of non-overlapping pixel blocks (e.g., an 8-pixel×8-pixel block) and a transformation algorithm is applied to the signal representing the changing intensities of the pixels in each block. One commonly used block-based transformation algorithm is the Discrete Cosine Transform (DCT). The DCT is a reversible transform that converts a spatial domain signal produced by the changing intensities of the pixels of a block to a block of transform coefficients representing the contributions of component intensity variation signals of various frequencies to the overall changes in intensity within the block. Lower frequency components represent slow changes of intensity and high frequency components represent the rapid changes in intensity that characterize object edges and image details. Since a single color characteristically predominates in a small area of an image, the transform coefficients for higher frequency components tend to be small. On the other hand, many image details are visually irrelevant for many applications and many of the small high frequency components can be discarded without visually objectionable distortion of the image.

The blocks of transform coefficients produced by the transformation 28 are scanned 30 in a zigzag pattern capturing an arrangement of the transform coefficients in an order of generally increasing frequency. The scanned transform coefficients are then quantized 32. Quantization is a "rounding off" operation where all transform coefficients having a value within one of plurality of value sub-ranges are mapped to a single value or quantization index or level. The extents of the value sub-ranges are established by a quantization parameter 34 that is typically adjustable to control the bit rate output by the encoder 22. Since transform coefficients representing high frequencies components tend to be small, many are rounded off to zero during quantization effectively discarding the information representing many details in the image and distorting the image when it is reconstructed for display. In lossy compression schemes quantization acts as a control for trading off image quality for bit rate or compression ratio.

Finally, one or more symbol modeling and encoding processes, such as variable length coding 36, are applied to the quantization indices output by the quantizer 32. During symbol modeling, code words or symbols are substituted for the quantization indices. In variable length coding 36, the length of the symbol encoding a quantization index varies according to the probability of occurrence of the quantization index in the data stream output by the quantizer 32. The data stream is further compressed if average length of the code symbols is less than the average length of the quantizer indices that are encoded. The code symbols encoding the compressed image, a code book 38 relating the code symbols and the encoded quantization indices, and the quantization parameter 34 are included in a bitstream 40 that is transmitted from the encoder 22 to a decoder 24 for decoding and display or stored for later decoding.

The decoder 24 reverses the processes of the encoder to convert the code symbols of the compressed bitstream 40 to pixels 44 for display to a viewer. The code book 38 generated during the variable length coding 36 is recovered from the bitstream 40 and used by the variable length decoder 46 to decode the quantization indices. The quantization parameter 34 is also recovered from the bitstream and input to the inverse quantizer 48 to establish the transform coefficient to be output for each quantization index obtained from the variable length decoder 46. Since quantization is a rounding off process, the transform coefficients output by the inverse quantizer 48 will be approximations of the coefficients produced by transformation 28 of the original image and the image produced with these reconstructed transformation coefficients will be a distorted reconstruction of the original image.

Following inverse quantization 48, the scanning process is reversed 50 to rearrange the order of the transform coefficients so that the reconstructed coefficients will appear in the same order as the transform coefficients appeared following transformation of the block of pixels. Finally, inverse transformation 52 is applied to convert the frequency domain data of the reconstructed transform coefficients to spatial domain intensities for pixels 44 in the reconstructed pixel blocks making up the decompressed image.

Image compression trades off data quantity for image distortion and computational effort. DCT-based transformation is reversible, provides good image decorrelation, and requires a generally acceptable level of computational effort. As a result, DCT transform coding is an underlying process for several digital image processing standards including the JPEG (Joint Photographic Experts Group) still image compression standard (ISO/IEC 10918) and the several of the MPEG (Motion Picture Experts Group) video compression standards (e.g., MPEG-2, ISO/IEC 13818).

While the required computation is acceptable for many applications, the computation requirements are not insignificant. Decoding ten 320×224 pixel frames per second requires approximately 16,800 inverse transformations per second. As a result, considerable effort has been devoted to developing efficient implementations of the inverse transformation algorithm. For example, Girod et al., U.S. Pat. No. 6,112,219, disclose a method of performing fast inverse discrete cosine transformation (IDCT) using look-up tables. As a result of symmetries in the DCT and IDCT, the transforms may be performed with a combination of lookup tables and butterfly operations, reducing the number of additions and subtractions required and eliminating the need for multiplication operations to perform the inverse transformation. The method reduces the number of calculations required to perform the inverse transformation at the decoder in exchange for increased storage to retain the table of precalculated results.

Reducing the computational requirements for inverse transformation speeds up the decoding process and can reduce the demand imposed on computational facilities at the decoder. However, inverse transformation is but one step in the decompression process and the remaining steps require several additional computations for each pixel. What is desired, therefore, is a decoding method and apparatus that reduce the time and computational effort required to decode compressed digital images.

DETAILED DESCRIPTION OF THE INVENTION

Digital images are commonly represented by an array of data expressing the intensities of a plurality of component colors for each of a plurality of picture elements or pixels arranged in a virtual rectangular array or grid. The values of the pixels are obtained by sampling the image at the coordinates of the corresponding pixel. Image sampling methods and apparatus, such as scanners and computer graphics programs, are capable of very fine resolution of the sampled intensity. The intensity of each component color of a pixel is commonly specified by eight data bits (256 levels) but may be specified with as many as 10 or 12 bits. In addition, the area of the image represented by a pixel must be quite small if a viewer is to perceive the plurality of pixels as an image and not as a collection of colored dots. An image displayed on a computer monitor commonly comprises more than 300,000 pixels but may include more than 800,000 pixels. For motion video sixty or more images per second may be required. To reduce the quantity of data required to digitally describe an image to levels that make storage and transmission practical for many applications, digital images are typically compressed. Digital image compression generally trades off data quantity for image distortion and computational complexity. For example, decompressing ten frames (320×224 pixels) per second requires that the decompression process be performed approximately 16,800 per second. The decoding method and apparatus of the present invention significantly reduce the time and computation required at the decoder to decompress a digital image.

Figure 2:
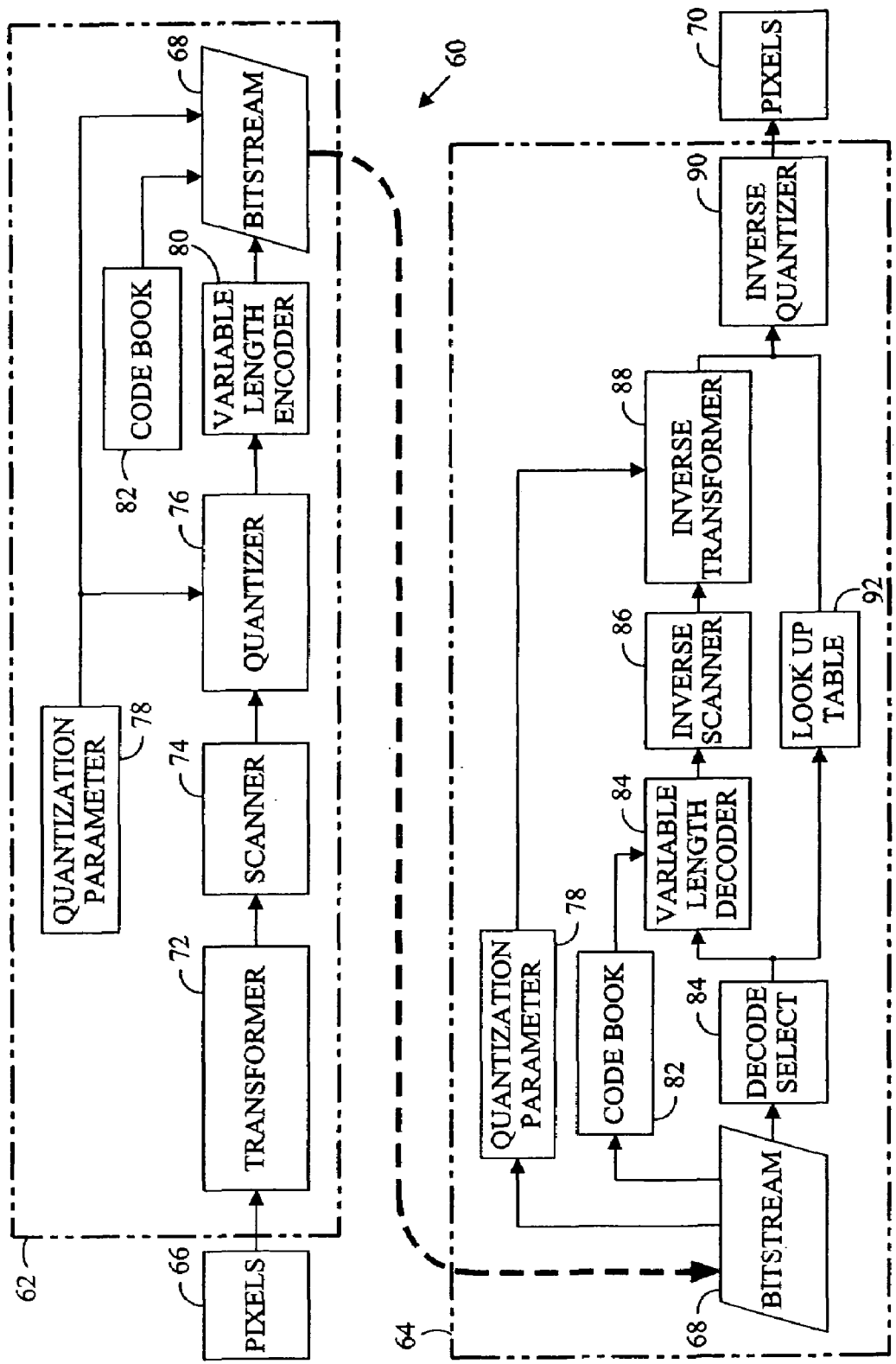
FIG. 2 is a block diagram of an exemplary image coder and decoder (codec) of the present invention.

Referring to FIG. 2, the digital image compression system 60 of the present invention comprises, generally, an encoder 62 to convert the pixel data 66 obtained by sampling an image into a bit stream 68 of compressed data and a decoder 64 to reverse the compression and convert the compressed bitstream 68 into the pixels 70 of a reconstructed image.

In the encoder 62, the spatial domain pixel data 66 is first transformed 72 to a plurality of transform coefficients. To obtain the data reduction necessary to make digital imaging practical for many applications, digital image compression commonly relies on lossy compression in which certain information, deemed visually irrelevant, is discarded during image compression. To aid in isolating information that is irrelevant to the human viewer, the pixels of the image are decorrelated into a plurality of spectral sub-bands of differing importance to the visual quality of the image. Typically, the data specifying the intensity of the individual pixels in the spatial domain are converted to a plurality of frequency domain transform coefficients expressing the contributions of lower and higher frequency components to the overall signal produced by the varying intensity of the image pixels.

For block-based transformation, the image is divided into a plurality of non-overlapping blocks of pixels (e.g., an 8-pixel×8-pixel or a 4-pixel×4-pixel block) and the signal representing the pixels of an isolated block is transformed. By way of example, the Discrete Cosine Transform (DCT) is a reversible transform that is commonly used in digital image compression systems to convert the spatial domain signal representing a block of pixels of differing luminosity or intensity to a plurality of frequency domain transform coefficients specifying the weights of component cosine signals contributing to the overall signal produced by intensity variation. Following transformation, the pixels of the block are represented by a block of transform coefficients that specify the weight of the DC or zero frequency component and weights of component signals of increasing frequency in both the horizontal and vertical directions.

Following transformation 72, the block of transform coefficients are scanned in a zigzag pattern 74. Since the values of transform coefficients representing high frequency components tend to be relatively small or even "zero," the zigzag pattern of the scan tends to concentrate the small or "zero" value transform coefficients in a run where they can be dealt with in an aggregate manner.

After zigzag scanning 74, the transform coefficients are quantized 76. The amplitude range of the transform coefficients is divided into a plurality of sub-ranges as dictated by a quantization parameter 78 and a quantization index or level is assigned to each of the plurality of sub-ranges as determined by the design of the quantizer 76. The transform coefficients are input to the quantizer 76 and the quantization index for the sub-range that includes the value of a transform coefficient is output by the quanitzer 76. Since the transform coefficients for higher frequency components representing image details tend to be small, the resulting indices produced by quantization tend to be zero effectively discarding the information describing these details from the compressed image data.

The quantization indices output by the quantizer 76 are subjected to one or more symbol modeling and encoding processes where a unique binary codeword or string of binary symbols is assigned to each possible quantizer index. Variable length coding 80, such as Huffman coding or arithmetic coding, is commonly used in image compression. In variable length coding, a statistical model of the quantizer indices is created and unique code symbols of differing length are assigned to each quantization index on the basis of the frequency of the quantization index in the data. A code book 82 relating the code symbols encoding to the compressed image and the corresponding quantization indices is generated by the variable length encoder 80 and is transmitted to the decoder for use in decoding the bitstream 68. The compressed bitstream 68 output by the encoder 62 includes the quantization parameter 78, the code book 82 of variable length codewords or symbols and corresponding quantizer indices, and the variable length symbols encoding quantizer indices.

Figure 1:
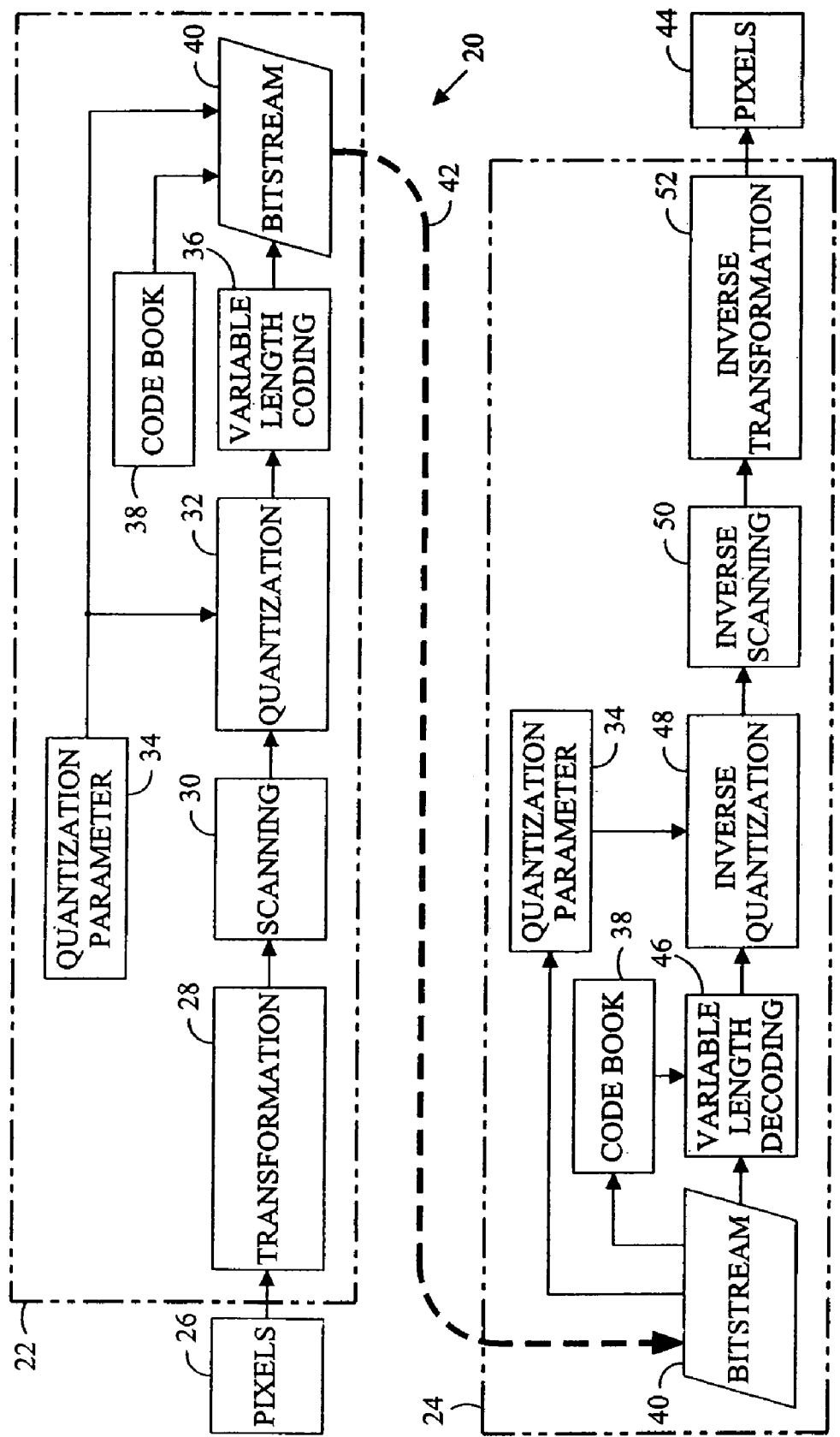
FIG. 1 is a block diagram of an exemplary prior art block-based image coder and decoder (codec).

Referring to FIG. 1, compressed digital images are typically decompressed by reversing the encoding processes. While digital image compression reduces the quantity of data required to describe the image, the computation necessary to compress and decompress the data is not insignificant. The computational complexity of the image compression is of particular importance in the construction of the decoder because time limits are often imposed on the decoding process by applications such as digital video and decoders are typically much more sensitive to cost pressure than are encoders. One method that has been used to reduce the computational requirements of decoding compressed images is replace the calculation of the inverse transformation with a table of precalculated pixel values that are accessed with a transform coefficient obtained by inverse quantization 48. However, the calculations required for inverse transformation comprise only part of the calculations required for decoding a compressed image and the table of precalculated results becomes unacceptably large if the results must account for additional decoding processes.

Digital image compression standards typically define the exact mathematical results for each of the decoding processes with the exception of inverse transformation. Decoders can commonly implement the inverse transformation with a number of inverse transformation algorithms if the accuracy of the inverse transformation is within specified limits. While this encourages development of new software and hardware based inverse transformation algorithms, such as the fast table-based inverse transform, each fast inverse transform has different quantization error statistics which causes error to accumulate at the decoder and images reconstructed by two decoders to be slightly different. To minimize the drift between different inverse transformation algorithms, the inverse quantization 48 is performed before inverse transformation 52 and reordering the two processes produces unacceptable distortion of the reconstructed image. On the other hand, if inverse quantization 48 is performed after inverse transformation 52 the precalculated results of the decompression process must include tables for each quantizer requiring a table far larger than is practical for an image decoder.

The present inventor realized, however, that substantial savings in computation could be achieved with a table-based, fast decoding system having an acceptable table size if the process was applied to a limited number of the more frequently occurring code symbols encoding the compressed image and if the precalculated results in the table were limited to single quantizer level. The inventor further concluded that image compression systems employing a bit accurate inverse transformation, such as the proposed International Telecommunications Union (ITU) video compression standard, H.26L, would permit the inverse transformation and inverse quantization processes to be commuted enabling a table of reasonable size to store precalculated quantized pixel values that are selected by the variable length code symbols encoding the compressed image. If inverse quantization is applied to the quantized pixel values following selection, only the quantized values need be included in the table reducing the number of table entries.

Figure 3:
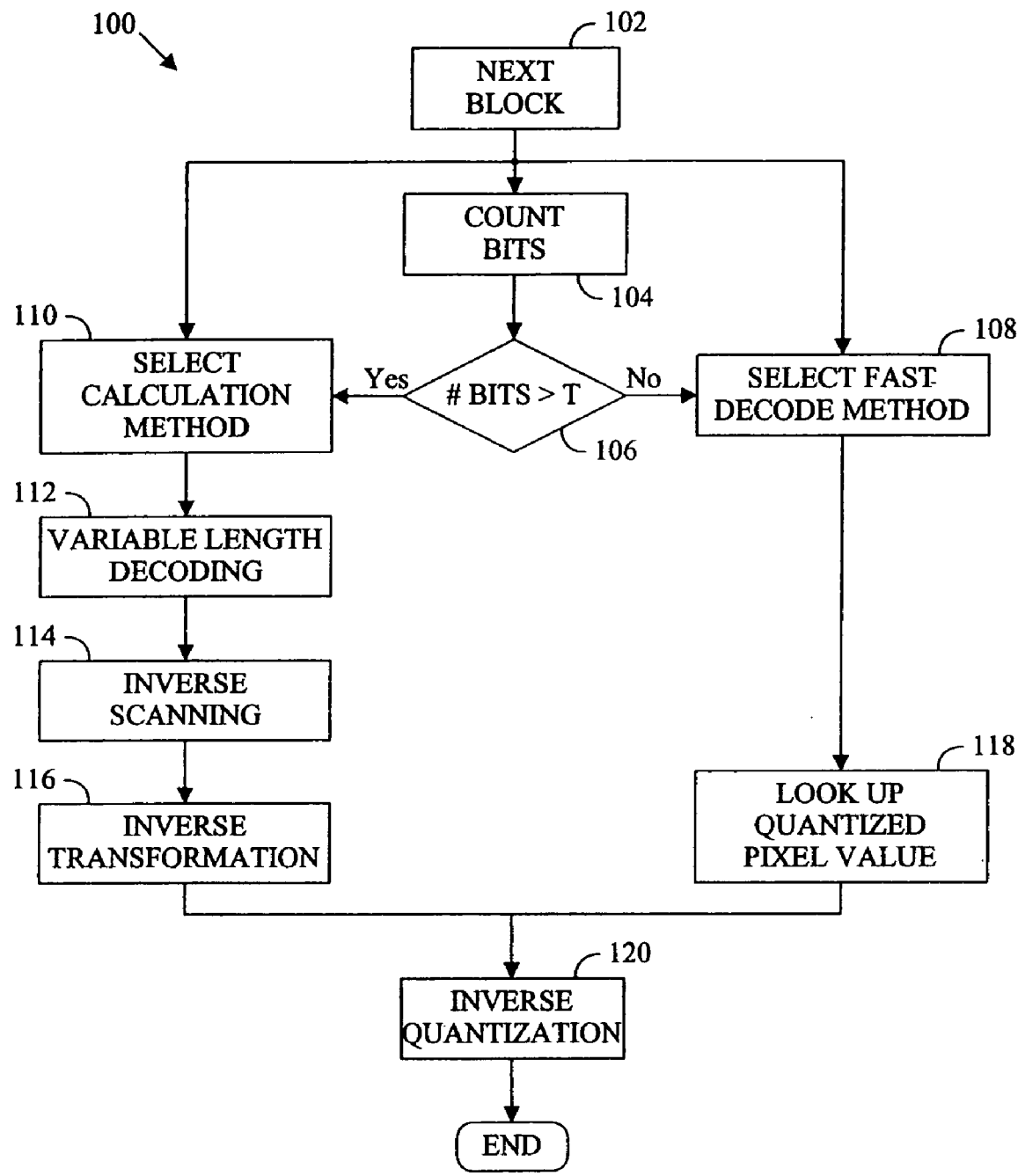
FIG. 3 is a flow diagram of the decoding method of the present invention.

Referring to FIGS. 2 and 3, in the decoder 64 and decoding method 100 of the present invention, the length of the variable length code symbols encoding a block of the compressed image is used to gauge the frequency of occurrence of the symbol and, as a consequence, whether the symbol will select a precalculated quantized pixel value from a table relating symbols and quantized pixel values or be used to calculate a quantized pixel value. Variable length symbols encoding a block 102 of the compressed image are received in the bitstream 68 at the decoder 64. In a decode selector 84, the number of bits encoding the each block are counted 104 as they are received. The length of a variable length coded symbol or codeword is a function of the frequency of the encoded symbol (the quantizer index) in the bitstream.

If the number of bits encoding a block exceeds the threshold number of bits 106, a calculation decoding method is selected 110. The code book 82 generated by the variable length coding 80 is recovered from the bitstream 68 and the code symbols are decoded 112 in the variable length decoder 84. The resulting quantization indices are inverse scanned 114 in the inverse scanner 86 to reorder the indices to the order occupied by the transform coefficients following transformation 72 of the pixel block at the encoder 62. Since the transformation and quantization commute, the quantization indices are then inverse transformed 116 in the inverse transformer 88 to obtain quantized pixel values which are input to the inverse quantizer 90. The inverse quantizer 90 outputs the pixels 70 of the reconstructed image.

If the number of bits in the symbols of the variable length encoded block is less than a threshold number of bits 106, the encoder selects the table-based, fast decoding process 108. In the fast decoding process, the code symbols obtained from the bitstream 68 are used to select a quantized pixel value 110 from the table relating a plurality of precalculated quantized pixel values and corresponding code symbols. The table 92 is initialized with quantized pixel values obtained from the inverse transformer 88 in response input of the more frequently occurring code symbols. The quantized pixel values are inverse quantized 120 in the inverse quantizer 90 to obtain the values of the image pixels.

The decoder and decoding method of the present invention accelerate the decoding process for compressed images by decoding the most frequently occurring symbols encoding the compressed image with a table-based, fast decoding process. By limiting the number of symbols included in the table and inverse quantizing the selected quantized pixel values a table of reasonable size can be used for the fast decoding process.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. A decoder for decompressing a compressed image comprising:
    (a) variable length symbol decoder to identify a quantization index corresponding to a variable length symbol encoding said compressed image;
    (b) an inverse transformer to convert said quantization index to a quantized pixel value; and
    (c) an inverse quantizer to convert said quantized pixel value to a pixel value for a decompressed image.

2. The apparatus of claim 1 further comprising an inverse scanner rearranging an order of a plurality of said quantizer indices to correspond to an order of transform coefficients transforming a block of pixels of said compressed image.

3. A decoder for reconstructing a compressed image comprising:
    (a) a decode mode selector selecting a first decoder if a number of bits included in a symbol encoding said compressed image is less than a threshold number of bits and otherwise selecting a second decoder;
    (b) said first decoder; and
    (c) said second decoder, which comprises:
        (i) a variable length symbol decoder to convert a symbol encoding said compressed image to a quantization index;
        (ii) an inverse transformer to convert said quantization index to a quantized pixel value; and
        (iii) an inverse quantizer to convert said quantized pixel value to a pixel of said reconstructed image.

4. The apparatus of claim 3 wherein said first decoder comprises:
    (a) a table relating a symbol encoding said compressed image and a quantized pixel value; and
    (b) an inverse quantizer to convert a quantized pixel value to a pixel of said reconstructed image.

5. The apparatus of claim 3 further comprising an inverse scanner rearranging an order of a plurality of said quantizer indices to correspond to an order of transform coefficients transforming a block of pixels of said compressed image.

* * * * *

UNITED STATES PATENT AND TRADEMARK OFFICE
CERTIFICATE OF CORRECTION

| | | |
|---|---|---|
| PATENT NO. | : 7,079,693 B2 | Page 1 of 1 |
| APPLICATION NO. | : 10/982637 | |
| DATED | : July 18, 2006 | |
| INVENTOR(S) | : Louis J. Kerofsky | |

It is certified that error appears in the above-identified patent and that said Letters Patent is hereby corrected as shown below:

Column 1, Line 59
Change "On common method" to --One common method--

Column 2, line 21
Change "one of plurality" to --one of a plurality--

Column 3, line 64
Change "are capable very fine" to --are capable of very fine--

Signed and Sealed this

Twenty-first Day of November, 2006

JON W. DUDAS
*Director of the United States Patent and Trademark Office*

UNITED STATES PATENT AND TRADEMARK OFFICE
CERTIFICATE OF CORRECTION

PATENT NO.         : 7,079,693 B2                                            Page 1 of 1
APPLICATION NO. : 10/982637
DATED              : July 18, 2006
INVENTOR(S)        : Louis J. Kerofsky It is certified that error appears in the above-identified patent and that said Letters Patent is hereby corrected as shown below:

Column 1, Line 59
Change "On common method" to --One common method--

Column 2, line 21
Change "one of plurality" to --one of a plurality--

Column 3, line 64
Change "are capable very fine" to --are capable of very fine--

Signed and Sealed this

Fourth Day of September, 2007

JON W. DUDAS
*Director of the United States Patent and Trademark Office*

UNITED STATES PATENT AND TRADEMARK OFFICE
CERTIFICATE OF CORRECTION

PATENT NO. : 7,079,693 B2  
APPLICATION NO. : 10/982637  
DATED : July 18, 2006  
INVENTOR(S) : Louis J. Kerofsky Page 1 of 1

It is certified that error appears in the above-identified patent and that said Letters Patent is hereby corrected as shown below:

<u>Column 1, Line 59</u>  
Change "On common method" to --One common method--

<u>Column 2, line 21</u>  
Change "one of plurality" to --one of a plurality--

<u>Column 3, line 64</u>  
Change "are capable very fine" to --are capable of very fine--

Signed and Sealed this

Fifth Day of February, 2008

JON W. DUDAS  
*Director of the United States Patent and Trademark Office*

UNITED STATES PATENT AND TRADEMARK OFFICE
CERTIFICATE OF CORRECTION

PATENT NO.         : 7,079,693 B2                                                Page 1 of 1
APPLICATION NO. : 10/982637
DATED              : July 18, 2006
INVENTOR(S)        : Louis J. Kerofsky It is certified that error appears in the above-identified patent and that said Letters Patent is hereby corrected as shown below:

<u>Column 1, Line 59</u>
Change "On common method" to --One common method--

<u>Column 2, Line 21</u>
Change "one of plurality" to --one of a plurality--

<u>Column 3, Line 64</u>
Change "are capable very fine" to --are capable of very fine--

Signed and Sealed this

Seventh Day of October, 2008

JON W. DUDAS
*Director of the United States Patent and Trademark Office*

UNITED STATES PATENT AND TRADEMARK OFFICE
CERTIFICATE OF CORRECTION

PATENT NO.        : 7,079,693 B2  
APPLICATION NO. : 10/982637  
DATED             : July 18, 2006  
INVENTOR(S)       : Louis J. Kerofsky Page 1 of 1

It is certified that error appears in the above-identified patent and that said Letters Patent is hereby corrected as shown below:

This certificate vacates the Certificates of Correction issued September 4, 2007, February 5, 2008, and October 7, 2008. The certificates are duplicates of the Certificate of Correction issued November 21, 2006. All requested changes were included in the Certificate of Correction issued November 21, 2006.

Signed and Sealed this

Twenty-fifth Day of November, 2008

JON W. DUDAS  
*Director of the United States Patent and Trademark Office*

UNITED STATES PATENT AND TRADEMARK OFFICE
CERTIFICATE OF CORRECTION

PATENT NO. : 7,079,693 B2
APPLICATION NO. : 10/982637
DATED : July 18, 2006
INVENTOR(S) : Louis J. Kerofsky It is certified that error appears in the above-identified patent and that said Letters Patent is hereby corrected as shown below:

Column 1, Line 59
Change "On common method" to "One common method"

Column 2, line 21
Change "one of plurality" to "one of a plurality"

Column 3, line 64
Change "are capable very fine" to "are capable of very fine"

Signed and Sealed this

Twenty-sixth Day of May, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,079,693 B2
APPLICATION NO. : 10/982637
DATED : July 18, 2006
INVENTOR(S) : Louis J. Kerofsky It is certified that error appears in the above-identified patent and that said Letters Patent is hereby corrected as shown below:

Column 1, line 59
Change "On common method" to "One common method"

Column 2, line 21
Change "one of plurality" to "one of a plurality"

Column 3, line 64
Change "are capable very fine" to "are capable of very fine"

Signed and Sealed this

Second Day of June, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,079,693 B2 | Page 1 of 1 |
| APPLICATION NO. | : 10/982637 | |
| DATED | : July 18, 2006 | |
| INVENTOR(S) | : Louis J. Kerofsky | |

It is certified that error appears in the above-identified patent and that said Letters Patent is hereby corrected as shown below:

<u>Column 1, line 59</u>
Change "On common method" to "One common method"

<u>Column 2, line 21</u>
Change "one of plurality" to "one of a plurality"

<u>Column 3, line 64</u>
Change "are capable very fine" to "are capable of very fine"

Signed and Sealed this
Seventh Day of June, 2011

David J. Kappos
*Director of the United States Patent and Trademark Office*